Patented Mar. 19, 1946

2,396,997

UNITED STATES PATENT OFFICE 2,396,997

POLYMERIZATION OF UNSATURATED ORGANIC COMPOUNDS IN THE PRESENCE OF SULPHUR-CONTAINING MODIFIERS OF POLYMERIZATION

Charles F. Fryling, Akron, Ohio, assignor to The B. F. Goodrich Company, New York, N. Y., a corporation of New York No Drawing. Application November 11, 1942, Serial No. 465,266

7 Claims. (Cl. 260—83)

This invention relates to the polymerization of unsaturated organic compounds to form high molecular weight linear polymers and particularly to a method of effecting the polymerization of unsaturated organic compounds which contain a single ethylenic double bond conjugated with respect to another different type of unsaturated linkage, whereby polymers of improved properties and of greater usefulness for a variety of technical purposes are obtained.

It is known that many organic compounds containing an ethylenic double bond, that is, a double bond linking two aliphatic carbon atoms, are capable of polymerizing to form high molecular weight linear polymers and that the ability of such compounds to polymerize is increased when the ethylenic double bond is present in a conjugated system. When the ethylenic double bond is conjugated with another similar ethylenic double bond, as in the conjugated diolefins such as butadiene-1,3, the products of the polymerization are elastic vulcanizable, rubbery materials which have been termed synthetic rubber; but when the ethylenic double bond is conjugated with some other different type of unsaturated linkage such as a double bond present in an aromatic ring, as in styrene for example, or a carbon to oxygen double bond, as in the acrylic esters for example, the products are generally thermoplastic synthetic resins which are incapable of being vulcanized with sulphur.

Although the properties of these resins vary with the particular compound polymerized and the conditions of the polymerization, they are generally hard, brittle, glassy resins which often possess other properties, such as resistance to attack by chemical agents, excellent dielectric characteristics, etc., which render them valuable for use in the manufacture of molded articles, films, varnishes and the like. However, they also have certain limitations particularly in plasticity and elasticity, which seriously restrict their field of use and even prohibit many particular uses. For example, polymerized styrene is a hard, brittle material which will not withstand flexing or stretching to any appreciable extent and, therefore, is unsuitable for the manufacture of flexible films or for the preparation of coating compositions which become flexed or wrinkled in use. Again, polymerized acrylic esters, although somewhat softer, more resilient and more rubbery than polystyrene, are insufficiently plastic to be milled, calendered, extruded or otherwise processed in a satisfactory manner and accordingly despite their somewhat rubbery properties it has not heretofore been possible to utilize these materials even as rubber substitutes.

It is therefore the principal object of this invention to provide a method whereby the polymerization of unsaturated organic compounds containing an ethylenic double bond conjugated with another different type of unsaturated linkage may be modified in a manner which produces more plastic, more elastic and more soluble polymers than those previously obtained from these compounds. Another object of the invention is to provide a method of preparing a tough flexible polymer of styrene having a lower molding temperature than previously prepared styrene polymers. Still another object of the invention is to prepare soft, plastic, somewhat rubbery polymers of acrylic esters which may be processed and compounded on standard rubber machinery to yield compositions valuable as rubber substitutes. Other objects of the invention will appear hereinafter.

These objects are accomplished in this invention by carrying out the polymerization of unsaturated organic compounds containing a single ethylenic double bond conjugated with another different type of unsaturated linkage, such as styrene, acrylic acid derivatives and the like, in the presence of small amounts of certain sulphur-containing organic compounds which have been termed "modifiers" of polymerization because of their ability to increase the plasticity, elasticity and solubility of polymeric materials prepared in their presence. The sulphur-containing compounds or polymerization modifiers employed may for the purposes of this invention be defined as organic compounds containing at least four carbon atoms and at least one divalent sulphur atom which is not a part of a ring structure and which is connected by its two valences to two different atoms at least one of which is a carbon atom. In other words these compounds contain at least four carbon atoms and also possess the characteristic structure,

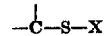

where X is any atom capable of forming a univalent bond with a divalent sulphur atom and C and X are not joined together in a ring structure. Numerous examples of types of sulphur compounds coming within this broad class will appear hereinafter.

The unsaturated organic compounds polymerized by the method of this invention are, as mentioned hereinabove, polymerizable unsaturated organic compounds containing a single ethylenic double bond conjugated with another different type of unsaturated linkage. The latter unsaturated linkage may be any double or triple bond occurring in organic compounds except, of course, an ethylenic double bond, and is ordinarily an unsaturated bond linking a pair of atoms one of which is a carbon atom. Thus, by way of example, the following types of polymerizable organic compounds, which types include practically all of the commonly used compounds in this broad class, may be employed:

(1) Polymerizable organic compounds containing a single ethylenic double bond conjugated with a carbon to carbon double bond occurring in an aromatic structure. Typical examples of compounds of this type include styrene and its polymerizable derivatives such as alpha-methyl styrene, p-chloro styrene, o-methoxy styrene, p-methyl styrene, nuclear-acyl styrenes and the like; vinyl naphthalene and its polymerizable derivatives, indene, divinyl benzene, beta-methyl styrene, benzal acetone, cinnamic acid, cinnamic aldehyde and the like.

(2) Polymerizable organic compounds containing a single ethylenic double bond conjugated with a carbon to oxygen double bond, i. e., compounds containing the structure

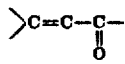

Typical examples of compounds of this type include acrylic and alpha-substituted acrylic acids and their esters, amides, etc., such as acrylic acid, methacrylic acid, methyl acrylate, ethyl acrylate, butyl acrylate, cyclohexyl acrylate, chloroethyl acrylate, methoxymethyl acrylate, methyl methacrylate, methyl ethacrylate, butyl methacrylate, ethyl methacrylate, ethyl alpha-chloro acrylate, acrylamide and the like; other alpha-beta unsaturated carboxylic acids and their esters, amides, etc., such as ethyl crotonate, diethyl maleate, diethyl fumarate, maleic acid, maleic anhydride and the like; unsaturated ketones, such as methyl vinyl ketone, methyl isopropenyl ketone, phenyl vinyl ketone, and the like.

(3) Polymerizable organic compounds containing a single ethylenic double bond conjugated with a carbon to nitrogen triple bond, i. e., compounds of the structure >C=C—S≡N such as acrylic and alpha-substituted acrylic nitriles, crotonic acid nitrile and the like.

(4) Polymerizable organic compounds containing a single ethylenic double bond conjugated with a carbon to carbon triple bond such as vinyl acetylene, divinyl acetylene vinyl ethinyl alkyl carbinols and the like.

In all these types of unsaturated organic compounds, those compounds wherein the ethylenic double bond is present at the end of the chain, i. e., in a CH$_2$=C< group are usually more readily polymerizable and it is particularly with such compounds that this invention is concerned.

It is also within the scope of this invention to polymerize mixtures of the above described unsaturated organic compounds thereby obtaining copolymers instead of single polymers. Mixtures of the above-described unsaturated organic compounds with other copolymerizable compounds which may not be members of the above-defined class may similarly be used provided that the material polymerized consists predominantly of a compound or compounds having an ethylenic double bond conjugated with another different type of unsaturated linkage. For example it may be desirable to polymerize mixtures of styrene or acrylic esters with smaller amounts of butadiene-1,3 such as butadiene-1,3, chloroprene, isoprene and the like or with smaller amounts of vinyl or vinylidene compounds such as vinyl chloride, vinylidene chloride, vinyl acetate or the like.

As disclosed above, the polymerization of these polymerizable materials consisting predominantly of an unsaturated organic compound containing a single ethylenic double bond present in a conjugated system is carried out, by the method of this invention, in the presence of a small amount of a sulphur-containing organic compound having in its structure at least four carbon atoms and at least one non-nuclear divalent sulphur atom which is connected by its two valences to two different atoms one of which is a carbon atom. The other atom connected to the divalent sulphur atom is ordinarily a non-metallic atom such as another carbon atom or a hydrogen, nitrogen, sulphur or phosphorous atom but as will be seen hereinafter in some types of compounds it may also be a metallic atom. Coming within this broad class of sulphur-containing organic compounds there may be mentioned the following:

(1) Mercaptans or thiols containing at least four carbon atoms and possessing the general formula R—S—H wherein R is an alkyl, aryl, aralkyl, cycloalkyl or heterocyclic radical. The alkyl groups may be straight chained or branched, primary, secondary or tertiary, saturated or unsaturated and may contain in addition to carbon and hydrogen various radicals such as nitro, chloro and alkoxy. The nature of the aryl, aralkyl, cycloalkyl and heterocyclic groups may similarly be varied. The following are examples of specific mercaptans coming within this class:

n-Butyl mercaptan
n-Octyl mercaptan
2-ethyl hexyl mercaptan
Decyl mercaptan
Lauryl mercaptan
Thiobetanaphthol
Benzyl mercaptan
o-Nitro thiophenol
Cyclohexyl mercaptan
4-ethyl-2-mercapto thiazole
Mercaptobenzothiazole
4,5-dimethyl-2-mercapto thiazole (2) Organic sulphides, including both mono- and poly-sulphides, which contain at least four carbon atoms and have the general formula R—(S)$_n$—R wherein each R is a radical of the type defined above, and $n$ is an integer, usually from 1 to 4. The two R radicals may be the same or different but, of course, the sum of the carbon atoms in the two R radicals must be at least four Typical examples of compounds of this type are:

Diethyl sulphide
Di-2-ethyl hexyl disulphide
Di-p-nitrophenyl disulphide
Dibenzyl trisulphide
Tolyl disulphide
Dicyclohexyl disulphide
Dilauryl disulphide
Phenyl chloroethyl disulphide
Thiazyl-2 disulphide
Thiazylyl-2 disulphide
Bis-4,5-dimethyl thiazyl-2-disulphide
Ditetrahydrofurfuryl disulphide (3) Thio and dithioic acids and the salts, esters and sulfides derived therefrom which contain at least four carbon atoms and possess structures such as the following:

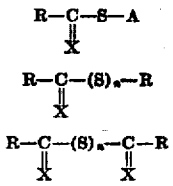

wherein each R is a radical of the same type as defined above; X is oxygen or sulphur, A is hydrogen or a base-forming radical such as an alkali or alkaline earth metal or an ammonium or substituted ammonium group and $n$ is an integer usually varying from 1 to 4. Examples of such compounds include:

Thiobutyric acid
Sodium dithiobenzoate
Tetramethyl ammonium dithio propionate
Dibenzoyl disulphide
Benzoyl ethyl sulphide
Benzothiazyl benzoyl disulphide (4) Xanthogenic acids and the salts, esters and sulphides derived therefrom which contain at least four carbon atoms and possess structures such as the following:

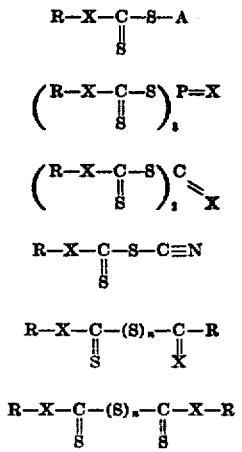

wherein R, X, A and $n$ are the same as defined hereinabove. Examples of compounds of this type include:

Sodium isopropyl xanthate
Tris (isopropoxythiono) trithiophosphate
Tris (ethoxythiono) tetrathiophosphate
Bis (ethoxythiono) trithiocarbonate
Isopropoxythiono cyano monosulphide
Isopropoxythiono benzoyl monosulphide
Di-isopropyl dixanthogen monosulphide
Di-isopropyl dixanthogen disulphide
Diethyl dixanthogen disulphide
Bis (tetrahydrofurfuryl-oxythiono) disulphide
Di-n-butyl xanthogen tetrasulphide
Di-n-amyl thioxanthogen disulphide (5) Thiocarbamic acids and the salts and sulphides derived therefrom which contain at least four carbon atoms and possess structures such as the following:

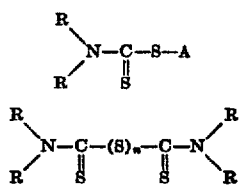

wherein R, A and $n$ are the same as defined hereinabove. Typical compounds of this type are:

Di-n-propyl ammonium di-n-propyldithiocarbamate
Dimethyl ammonium dimethyl dithiocarbamate
Sodium di-n-propyl dithiocarbamate
Piperidinium cyclopentamethylene - dithiocarbamate
Tetra methyl thiuram monosulphide
Tetra isopropyl thiuram disulphide Other sulphur containing organic compounds not included in any of the above formulae may also be employed if they contain at least four carbon atoms and at least one non-nuclear divalent sulphur atom connected by a single valence bond to at least one carbon atom. Obviously, however, not all of the sulphur compounds in this broad class are equally effective in increasing the plasticity and solubility of polymers of the type described which are prepared in their presence. Rather it has been found that, in general, those sulphur-compounds of the above class which are soluble in the material to be polymerized and are insoluble in water are most effective in this invention. Moreover, it has been found that sulphur compounds of the above class which contain a thiono,

group adjacent to the divalent sulphur atom are preferred. Still more preferred are those compounds which contain the structure:

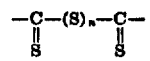

wherein $n$ is an integer from 1 to 4. Of these preferred compounds the xanthogen sulphides, including the xanthogeno poly- as well as monosulphides and also the corresponding thioxanthogen di-sulphides are particularly preferred, the dialkyl dixanthogen di-sulphides being the most commonly used compounds of this type. Another preferred type of sulphur compounds coming within the broad class are the mercaptans containing more than four carbon atoms, particularly the aliphatic mercaptans containing from 8 to 20 carbon atoms.

The amount of any given sulphur-compound employed in the polymerization of any given unsaturated organic compound of the type described will depend upon a variety of factors including the degree to which it is desired to modify the properties of the polymer (in general the larger the amount of sulphur compound employed the softer and more plastic is the polymer) and the other effects, if any, of the sulphur-compound on the polymerization. Thus, in some instances the sulphur compounds not only modify the properties of the polymers but also act as polymerization retarders or inhibitors and this latter effect increases with the amount of sulphur-compound employed. In general, it has been found that the optimum amount of the sulphur compound should be less than about 2% and preferably from 0.01 to 1% by weight of the material polymerized since in such concentration the plasticity and solubility of the polymers is increased the desired amount while the inhibitory or retarding effect of the sulphur compound, if any, may be overcome by the use of appropriate polymerization catalysts.

The polymerization of the unsaturated organic compounds described, in the presence of small amounts of the sulphur-compounds described, may be effected in various ways, e. g., by the homogenous or "bulk" method, in solution, by the "granular" or "pearl" method and by the "emulsion" method. In the first method the monomer or mixture of monomers without diluent and containing, if desired, a small percentage of a polymerization catalyst as well as the sulphur-compound is caused to polymerize. The product in this case is a solid mass. In the solution method the polymerization may be carried out in a medium which is a solvent for the monomer but a non-solvent for the polymer, or the polymerizates may be carried out in a medium which is a solvent both for the monomer and the polymer. In the first modification of the solution method organic solvents such as aliphatic alcohols or mixtures thereof with water may be used, and the polymers are usually precipitated as they are formed in finely-divided or flocculent form which in the second modification of the solution method the products are obtained in the form of more or less viscous solutions which may if desired be used directly as coating compositions.

In the "granular" method the monomer or monomer mixture containing a small percentage of a polymerization catalyst as well as the sulphur-compound is rapidly agitated with an aqueous solution containing a small percentage of a protective colloid such as soluble starch, polyvinyl alcohol, or the like, in a vessel equipped with a reflex condenser at such temperature that moderate reflux is maintained. Under these conditions the monomer is dispersed in the form of small droplets which solidify as polymerization proceeds to yield the polymer in the form of small granules or globules. After cessation of the agitation the granules may be filtered from the mixture, washed and dried.

In the "emulsion" method, which in many cases is the preferred method of conducting the polymerization, the monomer or mixture of monomers as well as the sulphur-compound and polymerization initiators, catalysts, etc., is agitated with an aqueous solution of an emulsifying agent such as a water-soluble soap or saponaceous material; for example, sodium, potassium or ammonium myristate or palmitate or a triethanolamine salt of lauric or myristic acid or the like; salts of alkyl naphthalene sulphonic acids such as sodium isopropyl naphthalene sulphonate; salts of hymolal sulphates such as sodium lauryl sulphate, quaternary ammonium salts such as cetyl trimethyl-ammonium chloride; or some other suitable emulsifying agent. After polymerization is complete the product remains dispersed in the aqueous medium and the resulting dispersion may be utilized as such or coagulated by the addition of acids, alcohols, salts, etc. After coagulation the product may be in the form of small crumbs which can be filtered, washed and dried.

In all these methods the polymerization is preferably initiated by the presence of polymerization initiators, sometimes also called catalysts, such as the per-oxygen compounds including peroxide such as hydrogen peroxide, sodium peroxide, benzoyl peroxide, dibutyryl peroxide, dilauroyl peroxide, succinyl peroxide and the like and per-salts such as sodium, potassium or ammonium persulphates, perborates, percarbonates, per-acetates and the like. Other materials variously termed polymerization catalysts, promoters, accelerators, etc., which are known to speed up the polymerization process under suitable conditions may also be employed.

The temperature at which the polymerization is conducted may be varied from about 30° C. to 100° C. or even higher depending on the method of polymerization used. In general, emulsion polymerization processes are carried out at somewhat lower temperature than when the polymerization is conducted in a homogeneous system. The time required for converting substantially all of the monomer into polymer is largely dependent on the conditions used and can vary from a few hours to several days.

The products of the polymerization vary in properties over a wide range and may be used for a number of purposes. However, in all cases it is noted that polymerization in the presence of one of the sulphur compounds hereinabove disclosed produces a softer, more plastic, more soluble, more coherent and often more elastic polymer than is produced under the same or similar conditions without the presence of the sulphur-compound. The products may be used for the production of molded goods, films, as coating compositions useful for coating or impregnating surfaces such as textiles, leather, paper, glass, metal, etc., as adhesives, as rubber substitutes, etc. They may be mixed with plasticizers, pigments, fillers, dyes, stabilizers, etc., and other natural or synthetic rubbery or resinous materials.

The following examples illustrate preferred modifications of the invention but it is not intended that the invention be limited to any of the details therein described.

*Example 1*

100 parts of monomeric styrene is mixed with 250 parts of an aqueous solution containing 2% by weight of a fatty acid soap to form an aqueous emulsion. To this aqueous emulsion there is then added 0.3 part of hydrogen peroxide, 0.60 part of sodium pyrophosphate and 0.2 part of di-isopropyl dixanthogen disulphide, and the emulsion is then agitated at 40° C. After about 64 hours a dispersion containing polystyrene is obtained. Coagulation of the emulsion, as by the addition of a salt solution, and washing and drying the coagulum, produces a substantially quantitative yield of polystyrene in the form of a white powder. When the powder is placed in a mold and heated for about 15 minutes at 90° C. an exceedingly tough yet flexible disc is obtained. When the powder is placed on heated rollers it coheres well, is soft and plastic and is easily admixed with pigments, plasticizers and the like. Repeating the above example except that no di-isopropyl dixanthogen disulphide is employed, however, yields a material which when molded is a hard, very brittle resin incapable of being worked readily on rollers.

*Example 2*

The above example is repeated except that a mixture of 75 parts of styrene and 25 parts of butadiene-1,3 is employed as the material to be polymerized. A 96% yield of a plastic, somewhat flexible resin is obtained in about 60 hours. The copolymer is easily worked on a roll mill to form a transparent sheet and may be molded at about 70° C. to yield a tough flexible disc. It is completely soluble in benzene and flexible films may be deposited from the solutions so obtained. When the mixture is polymerized in the absence of di-isopropyl dixanthogen disulphide, however, the copolymer obtained is hard, brittle, difficult to mill and to mold and only swells in benzene.

Example 3

120 parts of monomeric methyl acrylate, 240 parts of water, 6 parts of sodium lauryl sulphate, 0.36 part of potassium persulphate and 0.72 part of lorol mercaptan (the term "lorol" being used to designate the alkyl radical obtained from a mixture of aliphatic alcohols containing 8–18 carbon atoms and an average of about 12 carbon atoms) are mixed to form an aqueous emulsion and the resulting emulsion is agitated at 40° C. for about 20 hours. At the end of this time a dispersion is obtained which is coagulated to yield 114 parts of a soft, plastic coherent rubbery methyl acrylate polymer. The polymer may be easily milled, admixed with pigments and otherwise processed on standard rubber machinery. Another polymerization carried out in the same manner except that a mercaptan was not present, yielded a non-plastic, non-coherent material.

Example 4

100 parts of monomeric ethyl acrylate, 0.1 part of benzoyl peroxide and 0.25 part of lauryl mercaptan are heated in a homogeneous system at 85° C. for about 24 hours. At the end of this time a soft, plastic, coherent rubbery ethyl acrylate polymer which may be mixed with large quantities of carbon black and other pigments ordinarily used in compounding rubber without the use of plasticizers is obtained. In the absence of the mercaptan the polymer obtained is not sufficiently plastic to be admixed with pigments unless plasticizers are added.

Various modifications and variations in the material polymerized, the sulphur compounds employed, the method of polymerization, the catalysts or initiators employed and the conditions of the polymerization, as set forth in the above disclosure, may be made in the above examples without departing from the spirit and scope of the invention as defined in the appended claims.

I claim:

1. The process which comprises polymerizing a monomeric material consisting solely of a polymerizable organic compound selected from the class consisting of styrene and esters of acrylic acid in the presence of from 0.01 to 2% by weight based on the material polymerized of an organic compound of the formula:

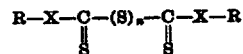

wherein R is alkyl; X is a member of the class consisting of oxygen and sulphur and $n$ is an integer from 1 to 4.

2. The process which comprises polymerizing a monomeric material consisting solely of from 0.01 to 2% by weight based on the material polymerized of styrene in the presence of an organic compound of the formula:

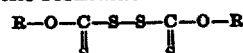

wherein R is alkyl.

3. The process which comprises polymerizing a monomeric material consisting solely of styrene in the presence of from 0.01 to 2% by weight based on the material polymerized of di-isopropyl xanthogen disulphide.

4. The process which comprises polymerizing a monomeric material consisting solely of ethyl acrylate in the presence of from 0.01 to 2% by weight based on the material polymerized of di-isopropyl xanthogen disulphide.

5. A high molecular weight polymer having improved plasticity and solubility, said polymer being prepared by the method of claim 1.

6. A high molecular weight polystyrene having improved plasticity and solubility and being prepared by the method of claim 2.

7. A high molecular weight polymer of ethyl acrylate having improved plasticity and solubility and being prepared by the method of claim 4.

CHARLES F. FRYLING.

---

Certificate of Correction

Patent No. 2,396,997.    March 19, 1946.

CHARLES F. FRYLING

It is hereby certified that errors appear in the printed specification of the above numbered patent requiring correction as follows: Page 2, first column, line 51, for that portion of the formula reading "—S≡N" read —C≡N; and second column, line 59, after the word "four" insert a period; page 3, second column, line 40, for "xanthogeno" read *xanthogen*; page 4, first column, line 54, after "sulphate" insert a semicolon; page 5, second column, lines 16 to 18, claim 2, for "from 0.01 to 2% by weight based on the material polymerized of styrene in the presence" read *styrene in the presence of from 0.01 to 2% by weight based on the material polymerized*; and that the said Letters Patent should be read with these corrections therein that the same may conform to the record of the case in the Patent Office.

Signed and sealed this 24th day of September, A. D. 1946.

[SEAL]

LESLIE FRAZER,
*First Assistant Commissioner of Patents.*

Example 3

120 parts of monomeric methyl acrylate, 240 parts of water, 6 parts of sodium lauryl sulphate, 0.36 part of potassium persulphate and 0.72 part of lorol mercaptan (the term "lorol" being used to designate the alkyl radical obtained from a mixture of aliphatic alcohols containing 8-18 carbon atoms and an average of about 12 carbon atoms) are mixed to form an aqueous emulsion and the resulting emulsion is agitated at 40° C. for about 20 hours. At the end of this time a dispersion is obtained which is coagulated to yield 114 parts of a soft, plastic coherent rubbery methyl acrylate polymer. The polymer may be easily milled, admixed with pigments and otherwise processed on standard rubber machinery. Another polymerization carried out in the same manner except that a mercaptan was not present, yielded a non-plastic, non-coherent material.

Example 4

100 parts of monomeric ethyl acrylate, 0.1 part of benzoyl peroxide and 0.25 part of lauryl mercaptan are heated in a homogeneous system at 85° C. for about 24 hours. At the end of this time a soft, plastic, coherent rubbery ethyl acrylate polymer which may be mixed with large quantities of carbon black and other pigments ordinarily used in compounding rubber without the use of plasticizers is obtained. In the absence of the mercaptan the polymer obtained is not sufficiently plastic to be admixed with pigments unless plasticizers are added.

Various modifications and variations in the material polymerized, the sulphur compounds employed, the method of polymerization, the catalysts or initiators employed and the conditions of the polymerization, as set forth in the above disclosure, may be made in the above examples without departing from the spirit and scope of the invention as defined in the appended claims.

I claim:

1. The process which comprises polymerizing a monomeric material consisting solely of a polymerizable organic compound selected from the class consisting of styrene and esters of acrylic acid in the presence of from 0.01 to 2% by weight based on the material polymerized of an organic compound of the formula:

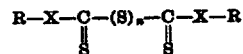

wherein R is alkyl; X is a member of the class consisting of oxygen and sulphur and $n$ is an integer from 1 to 4.

2. The process which comprises polymerizing a monomeric material consisting solely of from 0.01 to 2% by weight based on the material polymerized of styrene in the presence of an organic compound of the formula:

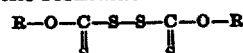

wherein R is alkyl.

3. The process which comprises polymerizing a monomeric material consisting solely of styrene in the presence of from 0.01 to 2% by weight based on the material polymerized of di-isopropyl xanthogen disulphide.

4. The process which comprises polymerizing a monomeric material consisting solely of ethyl acrylate in the presence of from 0.01 to 2% by weight based on the material polymerized of di-isopropyl xanthogen disulphide.

5. A high molecular weight polymer having improved plasticity and solubility, said polymer being prepared by the method of claim 1.

6. A high molecular weight polystyrene having improved plasticity and solubility and being prepared by the method of claim 2.

7. A high molecular weight polymer of ethyl acrylate having improved plasticity and solubility and being prepared by the method of claim 4.

CHARLES F. FRYLING.

---

Certificate of Correction

Patent No. 2,396,997.                                                                                              March 19, 1946.

CHARLES F. FRYLING

It is hereby certified that errors appear in the printed specification of the above numbered patent requiring correction as follows: Page 2, first column, line 51, for that portion of the formula reading "—S≡N" read —C≡N; and second column, line 59, after the word "four" insert a period; page 3, second column, line 40, for "xanthogeno" read *xanthogen*; page 4, first column, line 54, after "sulphate" insert a semicolon; page 5, second column, lines 16 to 18, claim 2, for "from 0.01 to 2% by weight based on the material polymerized of styrene in the presence" read *styrene in the presence of from 0.01 to 2% by weight based on the material polymerized*; and that the said Letters Patent should be read with these corrections therein that the same may conform to the record of the case in the Patent Office.

Signed and sealed this 24th day of September, A. D. 1946.

[SEAL]

LESLIE FRAZER,
*First Assistant Commissioner of Patents.*